(12) United States Patent
Maruyama et al.

(10) Patent No.: US 7,668,115 B2
(45) Date of Patent: Feb. 23, 2010

(54) SWITCHING APPARATUS

(75) Inventors: Ryo Maruyama, Kawasaki (JP); Takeshi Hatte, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 527 days.

(21) Appl. No.: 11/503,157

(22) Filed: Aug. 14, 2006

(65) Prior Publication Data

US 2007/0223456 A1    Sep. 27, 2007

(30) Foreign Application Priority Data

Mar. 23, 2006    (JP)    ............... 2006-080803

(51) Int. Cl.
*H04L 12/28*    (2006.01)
(52) U.S. Cl. ............... 370/254; 370/252; 370/522
(58) Field of Classification Search ............... None
See application file for complete search history.

(56) References Cited

U.S. PATENT DOCUMENTS

| | | | |
|---|---|---|---|
| 7,180,899 B2* | 2/2007 | De Silva et al. ........ | 370/395.31 |
| 7,209,435 B1* | 4/2007 | Kuo et al. ............... | 370/219 |
| 7,483,395 B2* | 1/2009 | Iwanaga et al. ......... | 370/254 |
| 7,496,052 B2* | 2/2009 | Jain et al. ............... | 370/254 |
| 7,594,029 B2* | 9/2009 | Fujita et al. ............. | 709/244 |
| 2002/0027906 A1* | 3/2002 | Athreya et al. .......... | 370/386 |
| 2004/0032868 A1 | 2/2004 | Oda | |

FOREIGN PATENT DOCUMENTS

| | | |
|---|---|---|
| JP | 2004-8032312 | 3/2004 |
| JP | 2005-1098271 | 4/2005 |

\* cited by examiner

*Primary Examiner*—Michael J Moore, Jr.
(74) *Attorney, Agent, or Firm*—Staas & Halsey LLP

(57) ABSTRACT

A switching apparatus for use in a network includes a packet reception processing unit which generates a reply packet as a response to a request packet having a virtual local area network tag and transmitted for a ping test via a network to the switching apparatus, and sets the same priority class in a virtual local area network tag of the reply packet as that in the virtual local area network tag of the request packet, wherein the switching apparatus performs priority control on the reply packet based on the priority class in the virtual local area network tag of the reply packet.

8 Claims, 16 Drawing Sheets

FIG.10

| VLAN TAG PRIORITY CLASS | INTERNAL PRIORITY LEVEL |
|---|---|
| 0 | LOW PRIORITY (WITHOUT PACKET LOSS PRIORITY) |
| 1 | LOW PRIORITY (WITH PACKET LOSS PRIORITY) |
| 2 | LOW PRIORITY (WITHOUT PACKET LOSS PRIORITY) |
| 3 | LOW PRIORITY (WITH PACKET LOSS PRIORITY) |
| 4 | INTERMEDIATE PRIORITY (WITHOUT PACKET LOSS PRIORITY) |
| 5 | INTERMEDIATE PRIORITY (WITH PACKET LOSS PRIORITY) |
| 6 | HIGH PRIORITY (WITHOUT PACKET LOSS PRIORITY) |
| 7 | HIGH PRIORITY (WITH PACKET LOSS PRIORITY) |

★ EXECUTION OF COMMAND
STATISTICAL INFORMATION DISPLAY COMMAND [PORT]

★ EXAMPLE OF RESULTS
[ Statistics Information:Port NO 1 ]

| Type | Item | | Value |
|---|---|---|---|
| ICMP | High | Packets | 5 |
| ICMP | High | Bytes | 400 |
| ICMP | High | Discard Packets | 0 |
| ICMP | Middle | Packets | 15 |
| ICMP | Middle | Bytes | 600 |
| ICMP | Middle | Discard Packets | 0 |
| ICMP | Low | Packets | 30 |
| ICMP | Low | Bytes | 1040 |
| ICMP | Low | Discard Packets | 1 |
| Others | High | Packets | 5 |
| Others | High | Bytes | 400 |
| Others | High | Discard Packets | 0 |
| Others | Middle | Packets | 15 |
| Others | Middle | Bytes | 600 |
| Others | Middle | Discard Packets | 0 |
| Others | Low | Packets | 30 |
| Others | Low | Bytes | 1040 |
| Others | Low | Discard Packets | 1 |

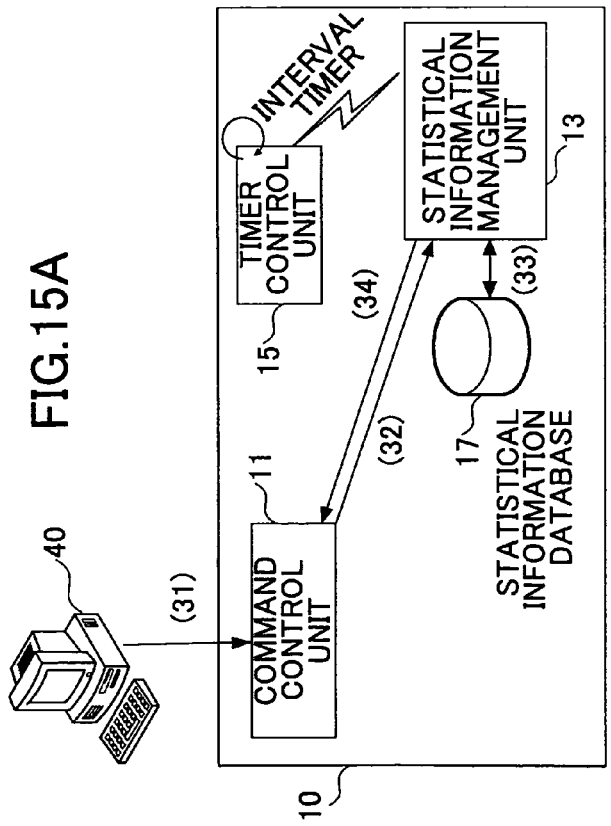

SWITCHING APPARATUS

BACKGROUND OF THE INVENTION

1. Field of the Invention

The present invention generally relates to a switching apparatus, and more particularly relates to a switching apparatus used as a member in a network.

2. Description of the Related Art

As shown in FIG. 1, in a network which is built up by connecting multiple layer 2 switching apparatuses, the ping function which transmits/receives control packets based on the Internet Control Message Protocol (ICMP) has been widely used to check the connection between switching apparatuses and to determine the amount of time required for connection.

The ping function is provided by OSI layer 3. As shown in FIG. 1, to confirm the reachability from a switching apparatus A to a switching apparatus B, a ping command is executed on the switching apparatus A with the IP address (10.21.137.222) of the switching apparatus B specified as the destination.

When the ping command is submitted to the switching apparatus A, the switching apparatus A transmits an ICMP request packet for the switching apparatus B to the network. When the switching apparatus B receives the ICMP request packet addressed to its own IP address, the switching apparatus B sends an ICMP reply packet to the switching apparatus A. By receiving the ICMP reply packet, the switching apparatus A confirms the reachability from the switching apparatus A to the switching apparatus B and determines the amount of time required for the connection.

Patent document 1 discloses an apparatus which performs connection tests by setting up virtual LANs (VLAN) with a layer 2 switching apparatus and by using the ping function.

Patent document 2 discloses a method of selecting an optimal route by determining response time for each VLAN using the ping function, and a LAN switch enabling this.

[Patent document 1] Japanese Patent Application Publication No. 2005-109827

[Patent document 2] Japanese Patent Application Publication No. 2004-080323

FIG. 2 is a drawing illustrating an exemplary process of receiving data packets in a switching apparatus having a quality of service (QoS) function. In FIG. 2, numbers in parentheses correspond to those in the description below. When a packet is input (1), the switching apparatus determines the internal priority level (high, intermediate, or low, for example) of the packet in the switching apparatus based on the priority class (0 through 7) stored in the VLAN tag (2), which is defined in IEEE 802.1Q. Then, the switching apparatus performs priority control on the packet as defined in IEEE 802.1p and transmits the packet (3). The switching apparatus has a packet buffer (queue) for each internal priority level. When the switching apparatus becomes congested with packets, lower priority packets are kept waiting in the packet buffers. In other words, transmission of those lower priority packets is delayed.

If the congestion is so severe that packets overflow from the packet buffers, those overflowed packets are discarded. By prioritizing the packets which go through the switching apparatus, the switching apparatus controls the packet transmission so that high priority packets go through the switching apparatus faster than other packets.

In a case where a packet did not arrive at an end user's apparatus or arrived after much delay, a network administrator checks if the apparatus is reachable and determines the response time by using the ping function based on ICMP as described above.

FIG. 3 is a drawing illustrating an exemplary process of transmitting an ICMP request packet in a switching apparatus. In FIG. 3, numbers in parentheses correspond to those in the description below. For example, the switching apparatus A specifies the IP address (for example, 10.21.137.222) of a destination switching apparatus (for example, the switching apparatus B) in an ICMP request packet, transmits the ICMP request packet to the network to check if the switching apparatus B is reachable (3), and then waits for an ICMP reply packet from the switching apparatus B (4).

FIG. 4 is a drawing illustrating an exemplary process of receiving an ICMP request packet in a switching apparatus. In FIG. 4, numbers in parentheses correspond to those in the description below. For example, the switching apparatus B determines whether the received ICMP request packet is addressed to the switching apparatus B itself by referring to the specified IP address (or MAC address). If the ICMP request packet is addressed to the switching apparatus B, it transmits an ICMP reply packet to the sender of the ICMP request packet (in this case, the switching apparatus A) (5).

In this way, it is possible to check if packets from the switching apparatus A can reach the switching apparatus B and to determine the packet response time between those apparatuses.

Besides for the failure analysis in a network currently in operation, the ping function can also be used when building a network or adding an apparatus to a network. For example, when an apparatus is added to a network, it may be necessary to check if the apparatus is correctly connected to the network, before starting a normal operation. In such a case, the connectivity of the apparatus can be confirmed based on the result of performing a ping test on the apparatus.

The ping function, however, has its limitations. Although the ping function serves as a tool to check if an apparatus is reachable, it cannot assess the reachability of normal data packets taking into account the effect of QoS at the layer 2 level.

For example, even when data packets are discarded or their delivery is delayed because those packets are treated as low priority packets, ICMP request packets for a ping test may be treated normally and ICMP reply packets may be returned without delay.

As a result, no problem may be identified in reachability and round-trip time. Thus, the limitations of the ping function have been making it difficult to identify problems in a network.

More precisely, for example, even if priority control in a switching apparatus is incorrect because of a setting error or a bug, the ping function cannot detect such a problem or perform a test to identify the problem.

The ping function does not refer to virtual local area network IDs (VLAN ID), and therefore cannot perform a ping test separately for each VLAN. For example, even if delivery delay occurs, in a route, only for packets with a certain VLAN ID, the ping function cannot analyze the situation.

Also, since ping reply packet transmission is not affected by QoS even when a network is congested with data packets, it is difficult to accurately determine packet round-trip time between switching apparatuses. Further, when transmitting ICMP packets from a switching apparatus, it has been difficult to perform a ping test taking into account the prioritization in that switching apparatus.

SUMMARY OF THE INVENTION

The present invention provides a switching apparatus that substantially obviates one or more problems caused by the limitations and disadvantages of the related art. Preferred embodiments of the present invention particularly provide a switching apparatus which makes it possible to confirm the reachability of an apparatus and to accurately determine the round-trip time of packets taking into account the effect of priority control on packets.

According to a preferred embodiment of the present invention, a switching apparatus for use in a network includes a packet reception processing unit which generates a reply packet as a response to a request packet having a virtual local area network tag and transmitted for a ping test via a network to the switching apparatus, and sets the priority class in a virtual local area network tag of the reply packet to the same class as that in the virtual local area network tag of the request packet, wherein the switching apparatus performs priority control on the reply packet based on the priority class in the virtual local area network tag of the reply packet. Such a switching apparatus makes it possible to confirm the reachability of an apparatus and to accurately determine the round-trip time of packets taking into account the effect of priority control on packets.

A switching apparatus according to a preferred embodiment may further include a request packet generating unit which generates a request packet used for a ping test and having a virtual local area network tag, and sets a source port, a destination port, and a priority class for the request packet as specified by a ping command, wherein the switching apparatus performs priority control on the request packet based on the priority class in the virtual local area network tag of the request packet.

In a switching apparatus according to a preferred embodiment, the packet reception processing unit may generate a reply packet only when the request packet has a specific virtual local area network ID in the virtual local area network tag.

A switching apparatus according to a preferred embodiment may further include a statistical information management unit which manages number-of-packets information separately for request/reply packets and normal data packets.

A switching apparatus according to a preferred embodiment may further include a ping response time measuring unit which, when a reply packet addressed to the switching apparatus is received, measures ping response time between generation of a request packet requesting the reply packet and reception of the reply packet.

Preferred embodiments of the present invention provide a switching apparatus which makes it possible to confirm the reachability of an apparatus and to accurately determine the round-trip time of packets taking into account the effect of priority control on packets.

BRIEF DESCRIPTION OF THE DRAWINGS

FIG. 10 is an example of a priority determining table;

FIG. 15A is a block diagram illustrating an exemplary process of retrieving statistical information according to a second embodiment of the present invention;

FIG. 15B is a drawing illustrating an exemplary display format of retrieved statistical information according to the second embodiment of the present invention;

DESCRIPTION OF THE PREFERRED EMBODIMENTS

Preferred embodiments of the present invention are described below with reference to accompanying drawings.

Figure 5:
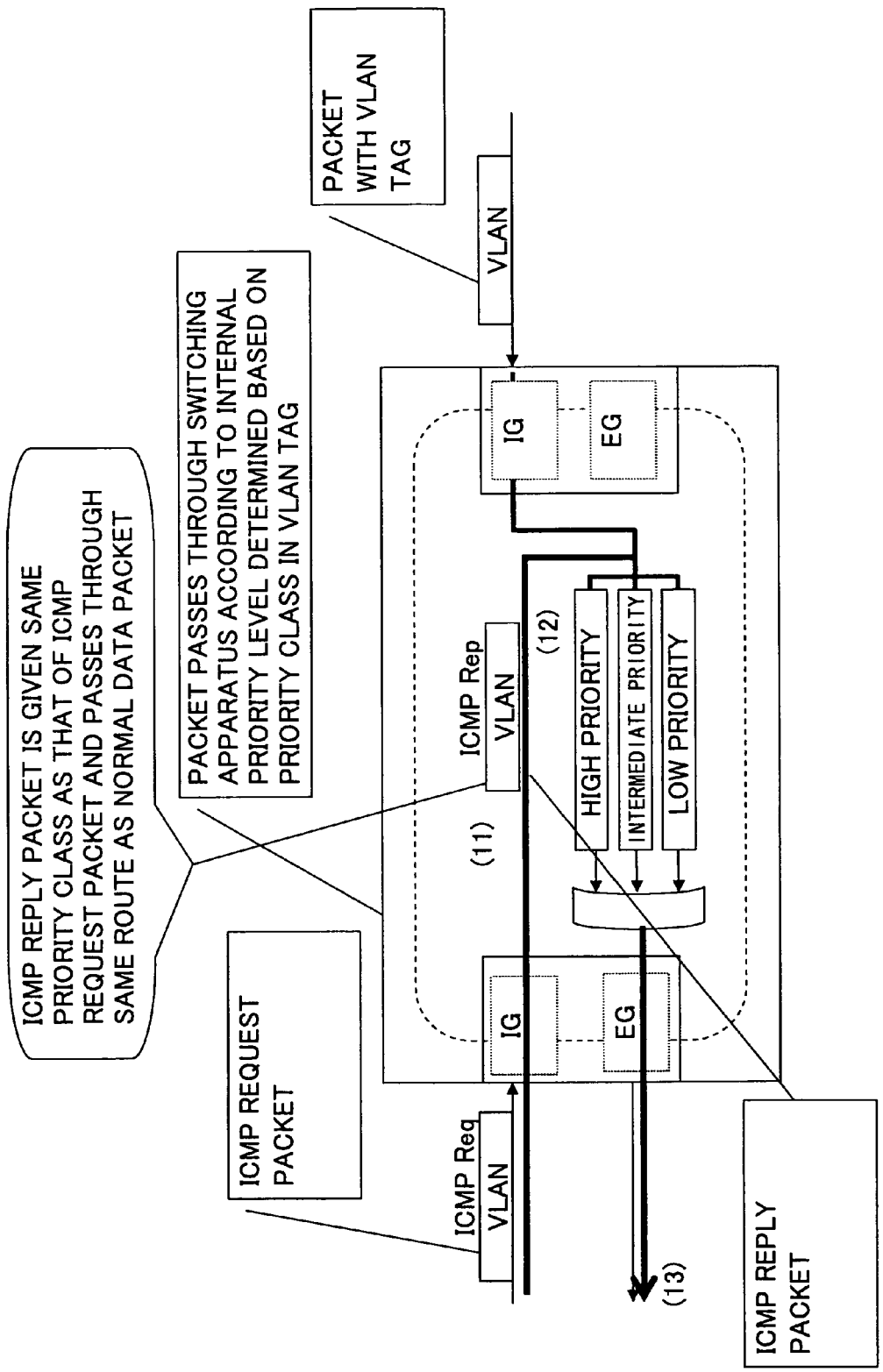
FIG. 5 is a drawing illustrating an exemplary process in a switching apparatus according to an embodiment of the present invention of receiving an ICMP request packet addressed to the switching apparatus itself.

FIG. 5 is a drawing illustrating a process in a switching apparatus according to an embodiment of the present invention of receiving an ICMP request packet addressed to the switching apparatus itself. In FIG. 5, numbers in parentheses correspond to those in the description below. The switching apparatus determines whether a received ICMP request packet is addressed to the switching apparatus itself by referring to the specified IP address (or MAC address). The switching apparatus also refers to the VLAN tag (virtual local area network tag) in the ICMP request packet and performs priority control on the ICMP request packet based on the priority class in the VLAN tag. The switching apparatus generates an ICMP reply packet, as a response to the ICMP request packet, at the ingress (IG) of its receiving port, and sets the priority class in the VLAN tag of the ICMP reply packet to the same class as that of the ICMP request packet (11). Then, the switching apparatus places the ICMP reply packet in a packet buffer (queue), in the switching apparatus, corresponding to the priority class (12), and transmits the ICMP reply packet from the egress (EG) of its receiving port (13).

As described above, a switching apparatus according to an embodiment of the present invention makes it possible to confirm the reachability of an apparatus and to accurately determine the round-trip time of packets taking into account the effect of priority control on packets. Such a switching apparatus makes it possible to analyze problems in a network. For example, such a switching apparatus makes it possible to identify which priority class of packets are discarded or delayed in delivery. Also, in such a switching apparatus, priority control is performed on ICMP control packets including ICMP request packets and ICMP reply packets in the same manner as normal data packets. Therefore, the round-trip time of an ICMP control packet is approximately the same as that of a normal data packet even when a network is congested. As a result, accurate packet round-trip time in a network can be measured.

Figure 6:
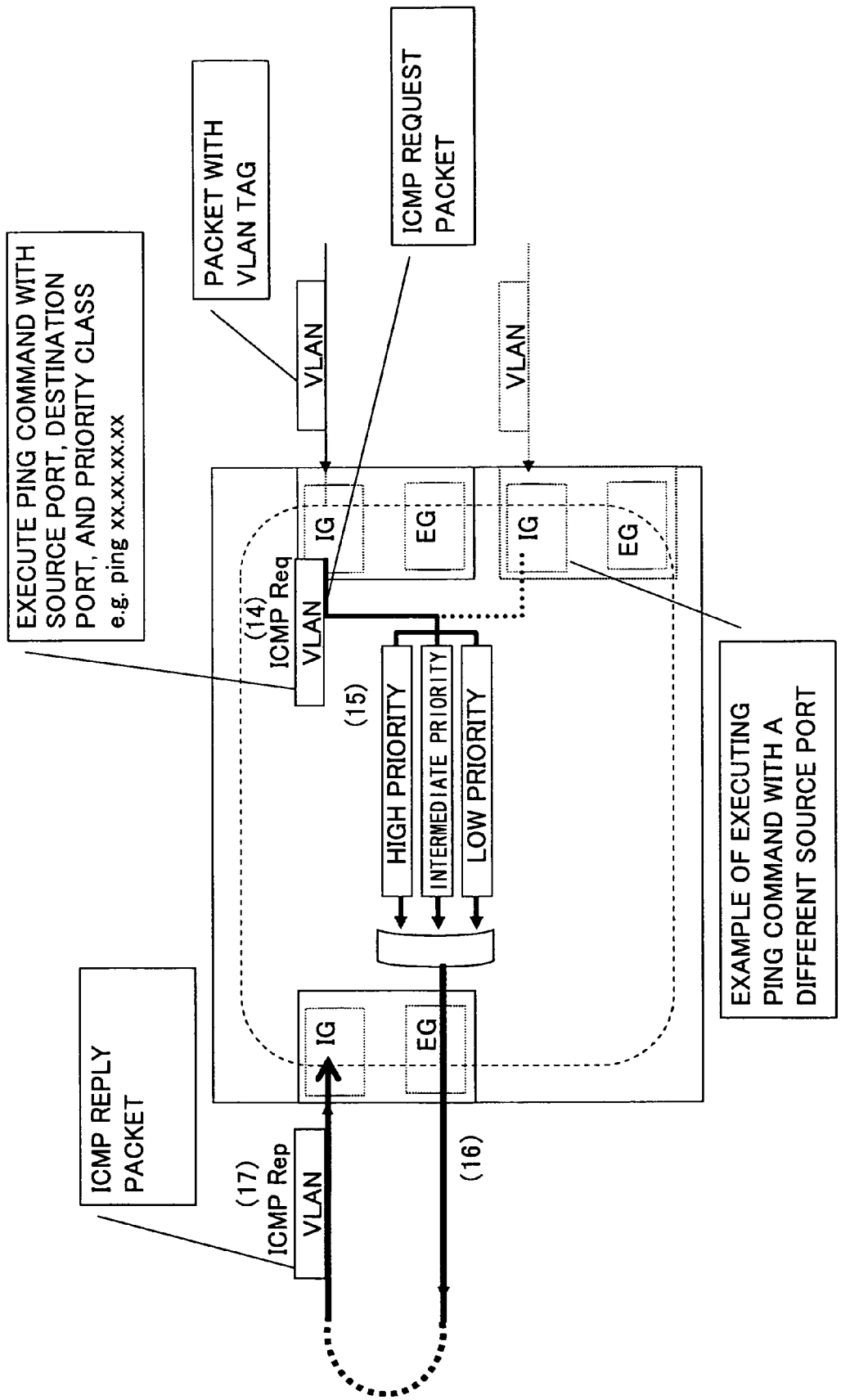
FIG. 6 is a drawing illustrating an exemplary process of transmitting an ICMP request packet in a switching apparatus according to an embodiment of the present invention.

FIG. 6 is a drawing illustrating a process in a switching apparatus according to an embodiment of the present invention of transmitting an ICMP request packet. In FIG. 6, numbers in parentheses correspond to those in the description below. In a switching apparatus according to an embodiment of the present invention, a ping command is executed with a destination IP address, a source port, a destination port, and a priority class.

The switching apparatus transmits an ICMP request packet with the specified priority class from the ingress (IG) of the specified source port (14). The ICMP request packet is prioritized and placed in a packet buffer (queue) corresponding to its priority class together with other data packets (15). Then, the ICMP request packet is transmitted from the egress (EG) of the specified destination port (16). The switching apparatus receives an ICMP reply packet at the ingress (IG) of the specified destination port (17).

Specifying a source port, a destination port, and a priority class for a ping command makes it possible to perform priority control, in the same manner as normal data packets, on the delivery of ICMP request packets from a source port to a destination port in a switching apparatus. Also, executing a ping command by changing the source port and/or the destination port makes it possible to test various packet routes in a switching apparatus.

Figure 7:
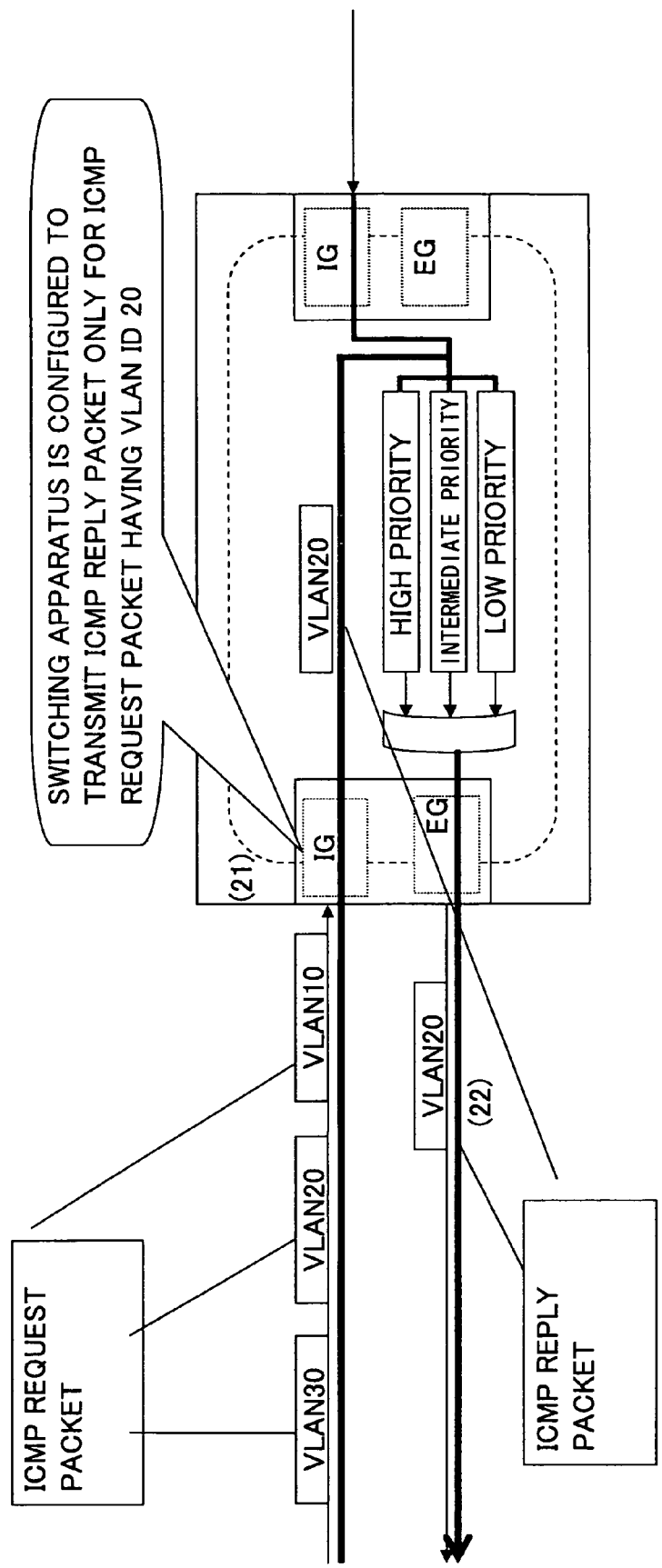
FIG. 7 is a drawing illustrating an exemplary process in a switching apparatus according to an embodiment of the present invention of receiving ICMP request packets addressed to the switching apparatus itself.

FIG. 7 is a drawing illustrating a process in a switching apparatus according to an embodiment of the present invention of receiving an ICMP request packet addressed to the switching apparatus itself. In FIG. 7, numbers in parentheses correspond to those in the description below. An exemplary switching apparatus shown in FIG. 7 is configured so as to, when an ICMP request packet addressed to the switching apparatus itself is received and when the VLAN ID of the ICMP request packet matches the VLAN ID that is set in advance for the ingress of the receiving port (21), transmit an ICMP reply packet from the egress (EG) of its receiving port as a response to the ICMP request packet (22). When the VLAN IDs do not match, the switching apparatus does not transmit an ICMP reply packet.

Such a switching apparatus described above makes it possible to perform a ping test separately for each VLAN, and thereby enables performing a ping test between switching apparatuses for each VLAN. Also, since a VLAN ID is often used to identify end users, such a switching apparatus makes it possible to perform ping tests taking into account end users.

1. First Embodiment

Figure 1:
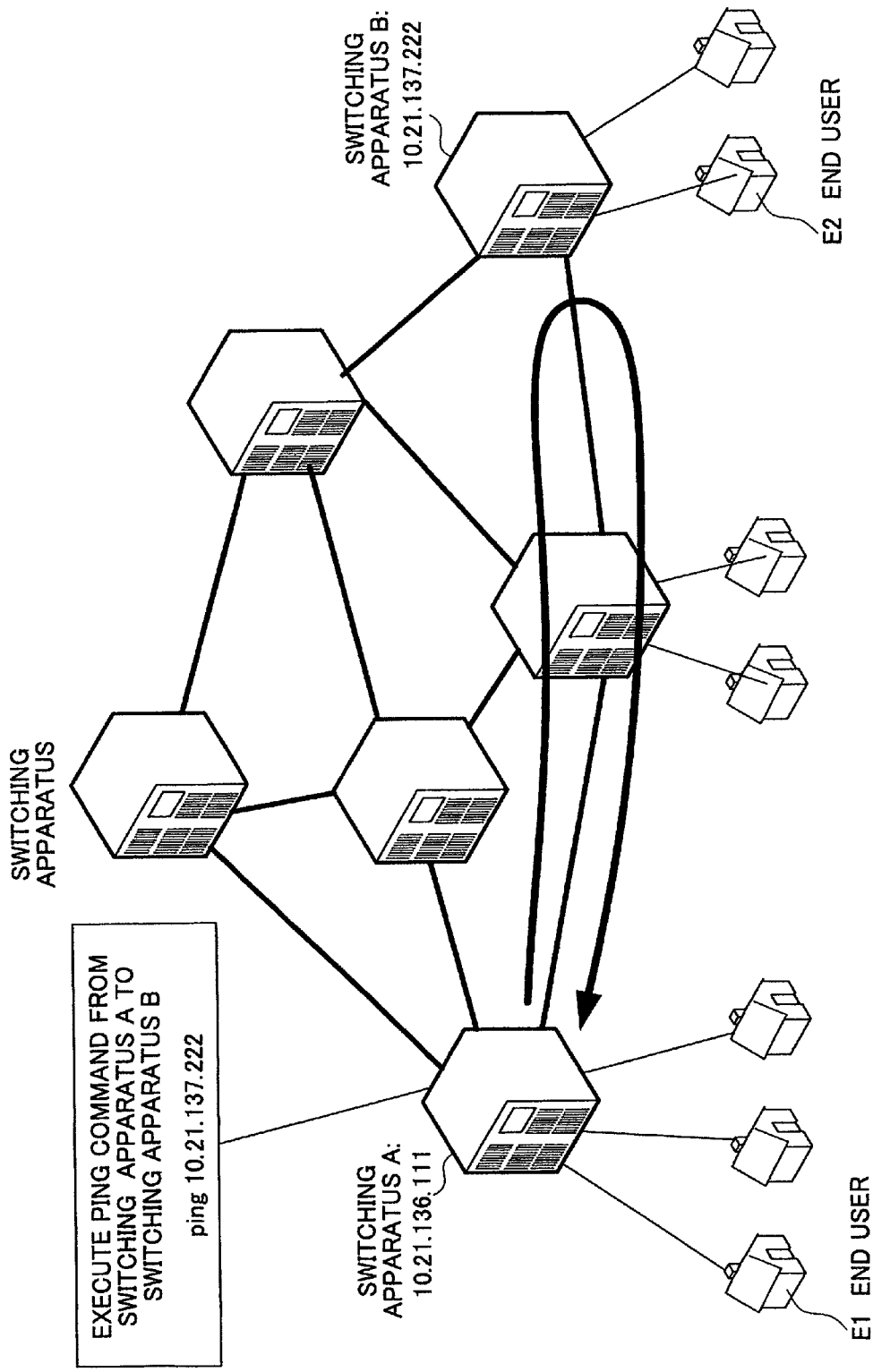
FIG. 1 is a drawing illustrating an exemplary network which is built up by connecting multiple layer 2 switching apparatuses.
Figure 2:
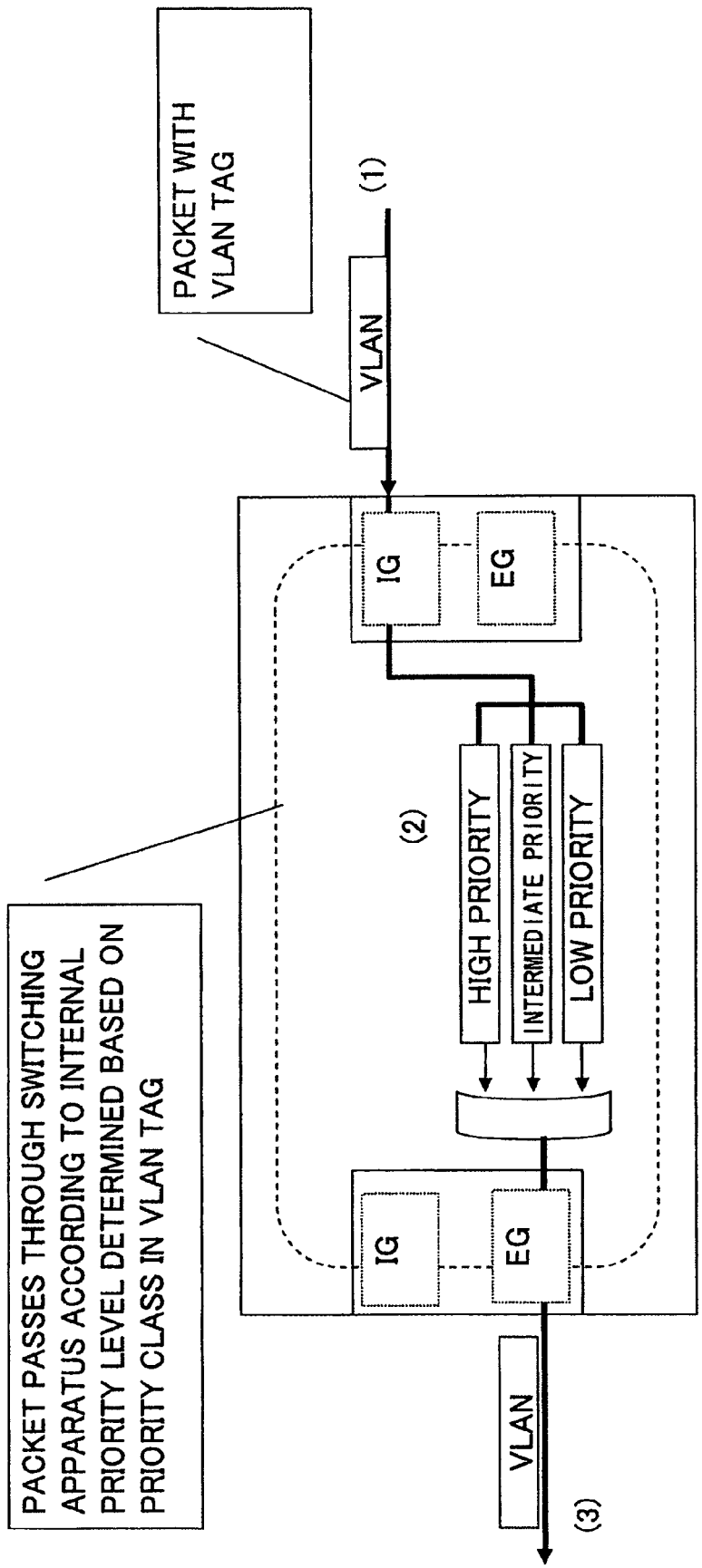
FIG. 2 is a drawing illustrating an exemplary process of receiving data packets in a switching apparatus having a quality of service (QoS) function.
Figure 3:
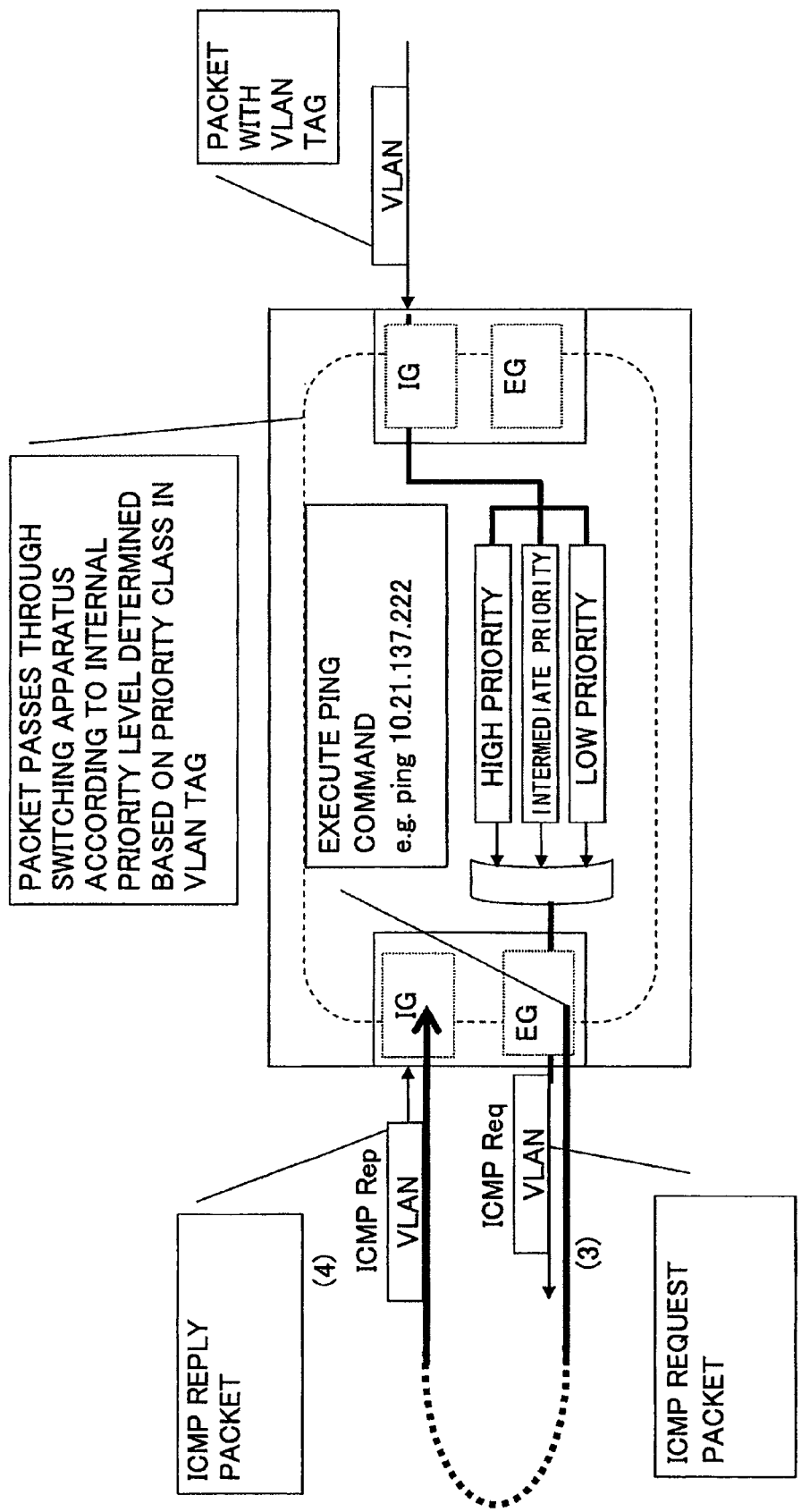
FIG. 3 is a drawing illustrating an exemplary process of transmitting an ICMP request packet in a switching apparatus.
Figure 4:
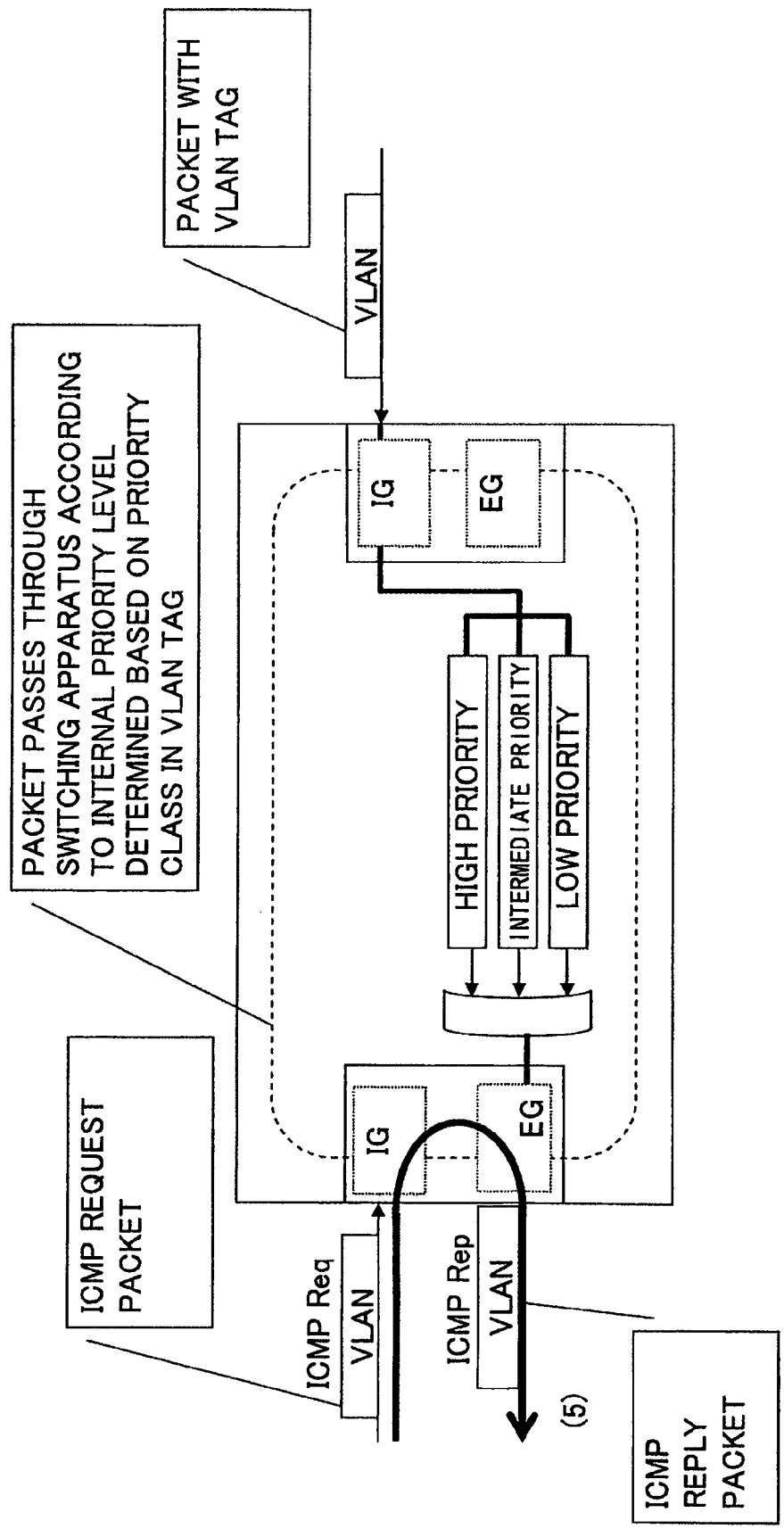
FIG. 4 is a drawing illustrating an exemplary process of receiving an ICMP request packet in a switching apparatus.

The descriptions below are based on an assumption that, in an exemplary network shown in FIG. 1, packets transmitted from an end user E1, which is connected to the switching apparatus A, to an end user E2, which is connected to the switching apparatus B, are discarded or delayed in delivery. In the first embodiment, reachability and response time between the switching apparatuses A and B are assessed using the ping function to identify the problems.

Figure 8:
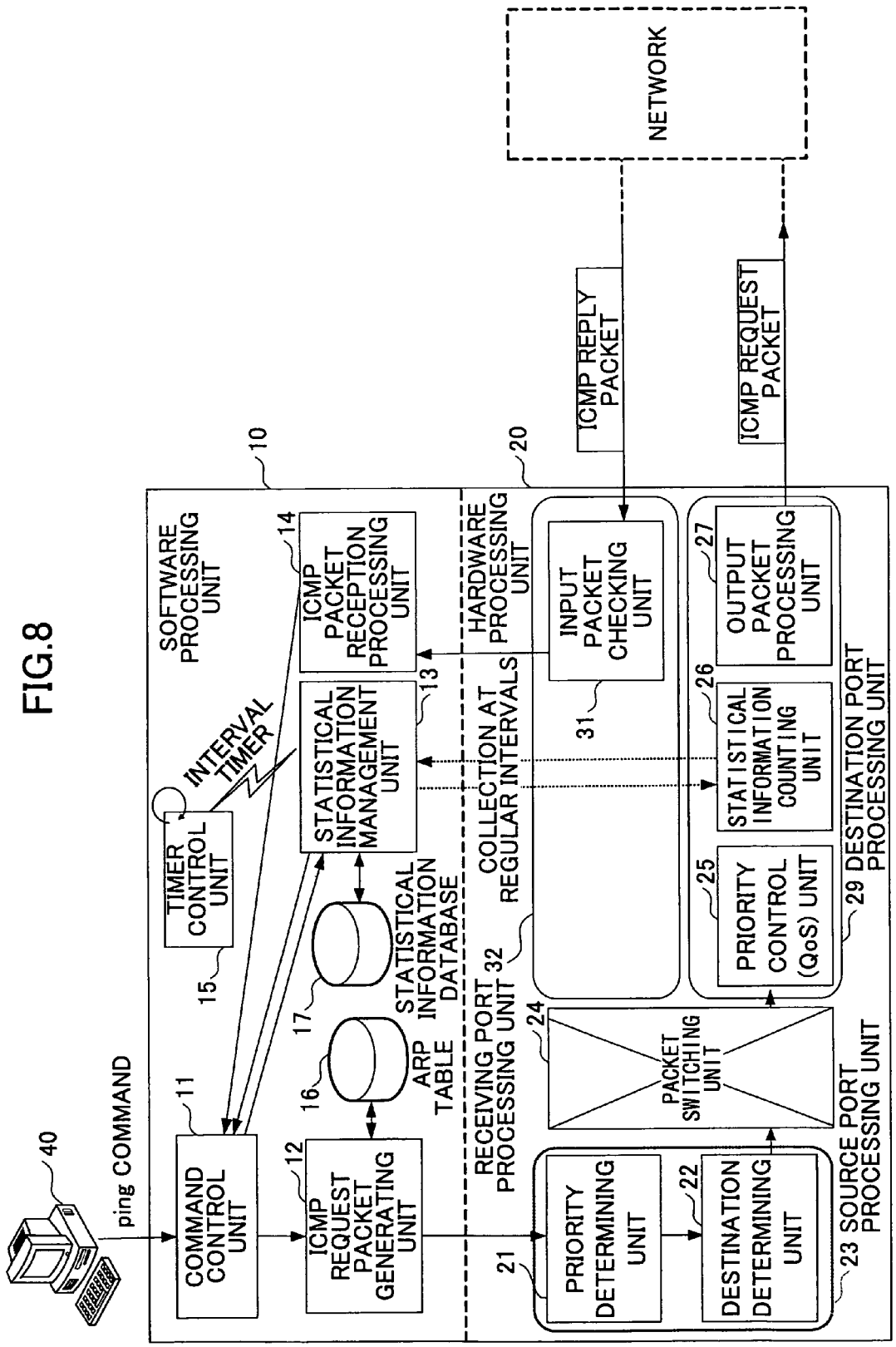
FIG. 8 is a block diagram illustrating an exemplary packet transmission processing block of a switching apparatus according to an embodiment of the present invention.
Figure 9:
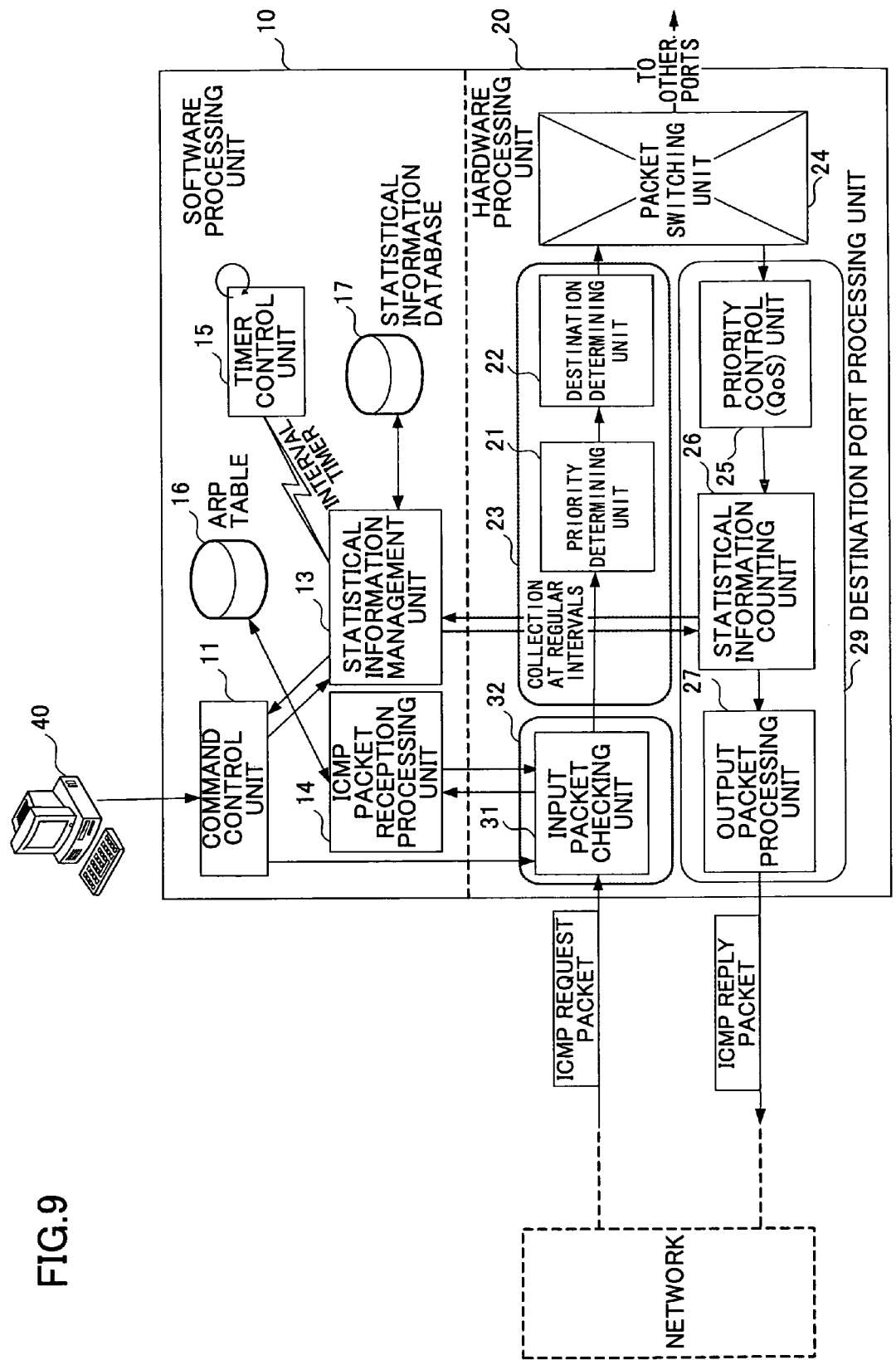
FIG. 9 is a block diagram illustrating an exemplary packet reception/reply processing block of a switching apparatus according to an embodiment of the present invention.

FIG. 8 is a block diagram illustrating an exemplary packet transmission processing block of a switching apparatus according to an embodiment of the present invention. FIG. 9 is a block diagram illustrating an exemplary packet reception/reply processing block of a switching apparatus according to an embodiment of the present invention.

As shown in FIG. 8, the packet transmission processing block includes a software processing unit 10 and a hardware processing unit 20. The software processing unit 10 includes a command control unit 11, an ICMP request packet generating unit 12, a statistical information management unit 13, an ICMP packet reception processing unit 14, a timer control unit 15, an address resolution protocol (ARP) table 16, and a statistical information database 17.

The hardware processing unit 20 includes a source port processing unit 23 including a priority determining unit 21 and a destination determining unit 22; a packet switching unit 24; a destination port processing unit 29 including a priority control (QoS) unit 25, a statistical information counting unit 26, and an output packet processing unit 27; and a receiving port processing unit 32 including an input packet checking unit 31.

A network administrator specifies the IP address of the switching apparatus B, a source port and a destination port of the switching apparatus A, and a priority class (0 through 7) to be stored in the VLAN tag, for a ping command; and submits the ping command to the switching apparatus A from a management apparatus 40 to perform a ping test on the switching apparatus B. After receiving the ping command from the management apparatus 40, the command control unit 11 of the switching apparatus A requests the ICMP request packet generating unit 12 to generate an ICMP request packet for the ping test.

The ICMP request packet generating unit 12 obtains a MAC address corresponding to the IP address of the switching apparatus B from the ARP table 16, and generates an ICMP request packet. Then, the ICMP request packet generating unit 12 transmits the ICMP request packet with the specified source port, destination port, and priority class to the priority determining unit 21 and the destination determining unit 22 of the source port processing unit 23.

The priority determining unit 21 includes a priority determining table as shown in FIG. 10. The priority determining unit 21 determines the priority queue (high priority, intermediate priority, or low priority) in which the ICMP request packet is to be placed based on the specified priority class (0 through 7) and the priority determining table.

The destination determining unit 22 transmits the ICMP request packet from the specified source port to the specified destination port in the same manner as a normal data packet. The ICMP request packet is treated in the same manner as a normal data packet. The ICMP request packet is switched to the specified destination port by the packet switching unit 24 and transmitted to the priority control unit 25 of the destination port processing unit 29.

Figure 11:
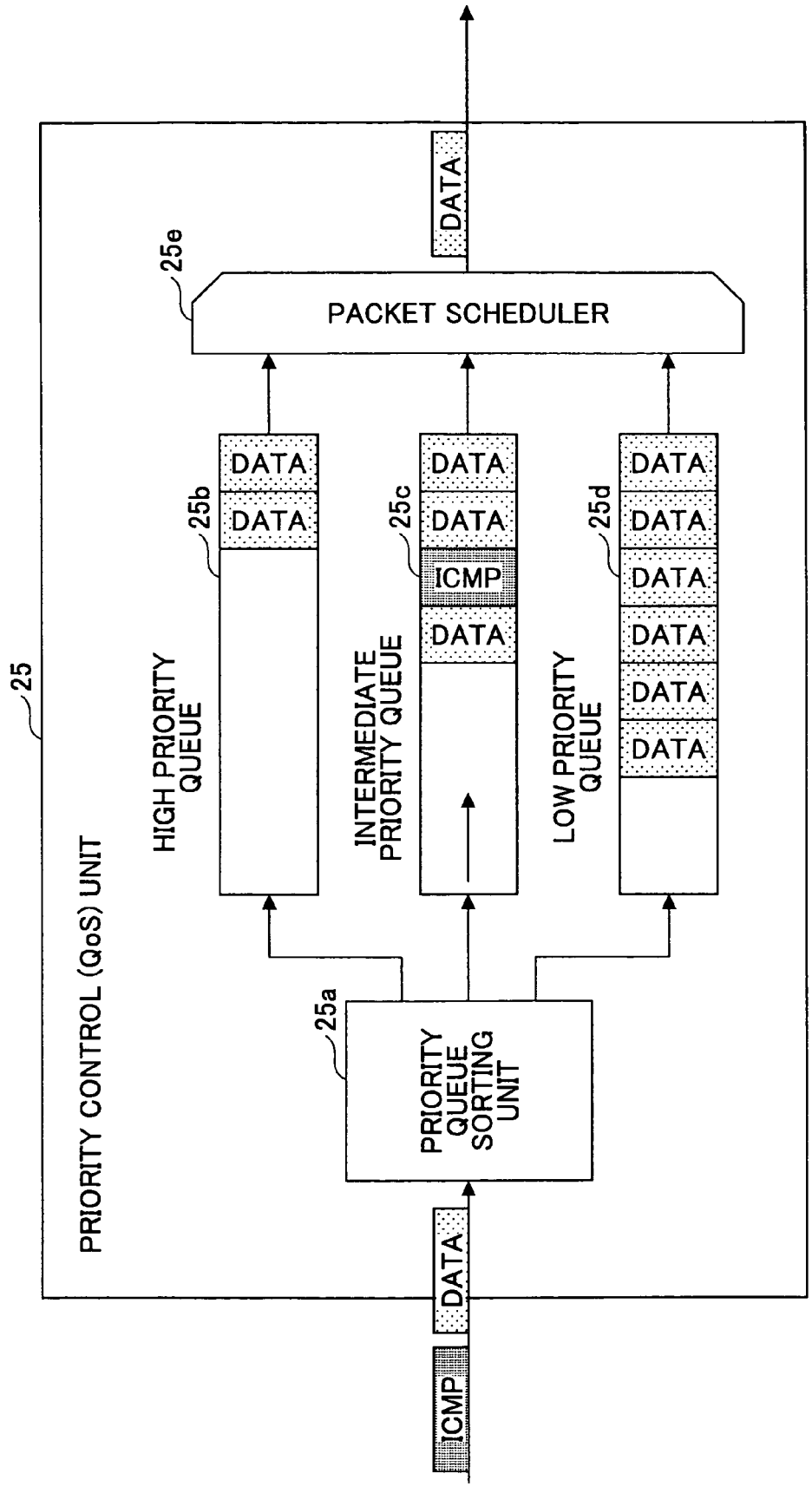
FIG. 11 is a drawing illustrating an exemplary configuration of a priority control (QoS) unit.

FIG. 11 is a drawing illustrating an exemplary configuration of the priority control (QoS) unit 25. A priority queue sorting unit 25a sorts packets into a high priority queue 25b, an intermediate priority queue 25c, or a low priority queue 25d based on the internal priority levels determined by the priority determining unit 21. Packets buffered in priority queues 25b through 25d are transmitted one by one to the statistical information counting unit 26 by a packet scheduler 25e in descending order of priority levels.

In an example shown in FIG. 11, the two data packets in the high priority queue 25b are first transmitted to the statistical information counting unit 26, and next the packets in the intermediate priority queue 25c are transmitted in right-to-left order. In FIG. 11, the ICMP request packet is positioned fifth in the overall order, and therefore is kept waiting in the queue until the four preceding packets transmitted.

The statistical information counting unit 26 identifies the internal priority level of each packet, determines whether it is an ICMP packet or any other type of packet by referring to its protocol number in the IP header, and increments a corresponding counter. Protocol number 1 indicates ICMP.

Figure 12:
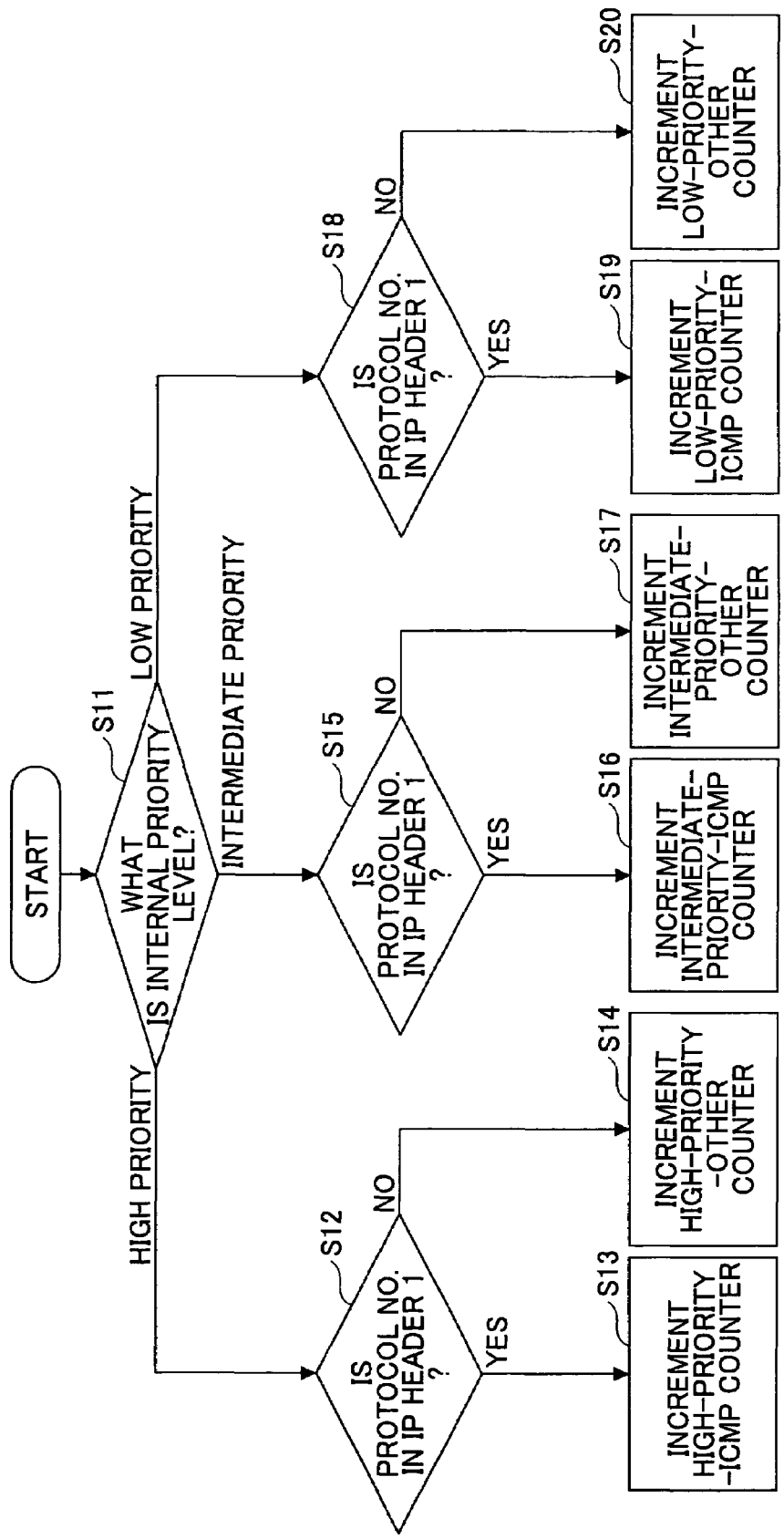
FIG. 12 is a flowchart illustrating an exemplary process performed by a statistical information counting unit.

FIG. 12 is a flowchart illustrating an exemplary process performed by the statistical information counting unit 26. In FIG. 12, the internal priority level of each packet is identified in step S11. When a packet is of high priority, the statistical information counting unit 26 determines whether it is an ICMP packet or any other type of packet in step S12. If the packet is an ICMP packet, a high-priority-ICMP counter is incremented in step S13; if the packet is another type, a high-priority-other counter is incremented in step S14.

When a packet is of intermediate priority, the statistical information counting unit 26 determines whether it is an ICMP packet or any other type of packet in step S15. If the packet is an ICMP packet, an intermediate-priority-ICMP counter is incremented in step S16; if the packet is another type, an intermediate-priority-other counter is incremented in step S17. When a packet is of low priority, the statistical information counting unit 26 determines whether it is an ICMP packet or any other type of packet in step S18. If the packet is an ICMP packet, a low-priority-ICMP counter is incremented in step S19; if the packet is another type, a low-priority-other counter is incremented in step S20.

The statistical information created by the statistical information counting unit 26 is collected at regular intervals by the statistical information management unit 13 and stored in the statistical information database 17 of the software processing unit 10.

After being counted by the statistical information counting unit 26, the ICMP request packet is transmitted from the destination port to the network by the output packet processing unit 27.

FIG. 9 is a block diagram illustrating an exemplary packet reception/reply processing block of a switching apparatus according to an embodiment of the present invention. In FIG. 9, the same reference numbers as those in FIG. 8 are used for corresponding units. As shown in FIG. 9, the packet reception/reply processing block includes a software processing unit 10 and a hardware processing unit 20. The software processing unit 10 includes a command control unit 11, a statistical information management unit 13, an ICMP packet reception processing unit 14, a timer control unit 15, an ARP table 16, and a statistical information database 17.

The hardware processing unit 20 includes a source port processing unit 23 including a priority determining unit 21 and a destination determining unit 22; a packet switching unit 24; a destination port processing unit 29 including a priority control (QoS) unit 25, a statistical information counting unit 26, and an output packet processing unit 27; and a receiving port processing unit 32 including an input packet checking unit 31.

A network administrator submits a command from a management apparatus 40 to the switching apparatus B to set a VLAN ID in advance. The switching apparatus B returns an ICMP reply packet in response to an ICMP request packet having the same VLAN ID. The command control unit 11 of the switching apparatus B obtains the VLAN ID from the submitted command and sets the VLAN ID for the input packet checking unit 31 of each receiving port.

Figure 13:
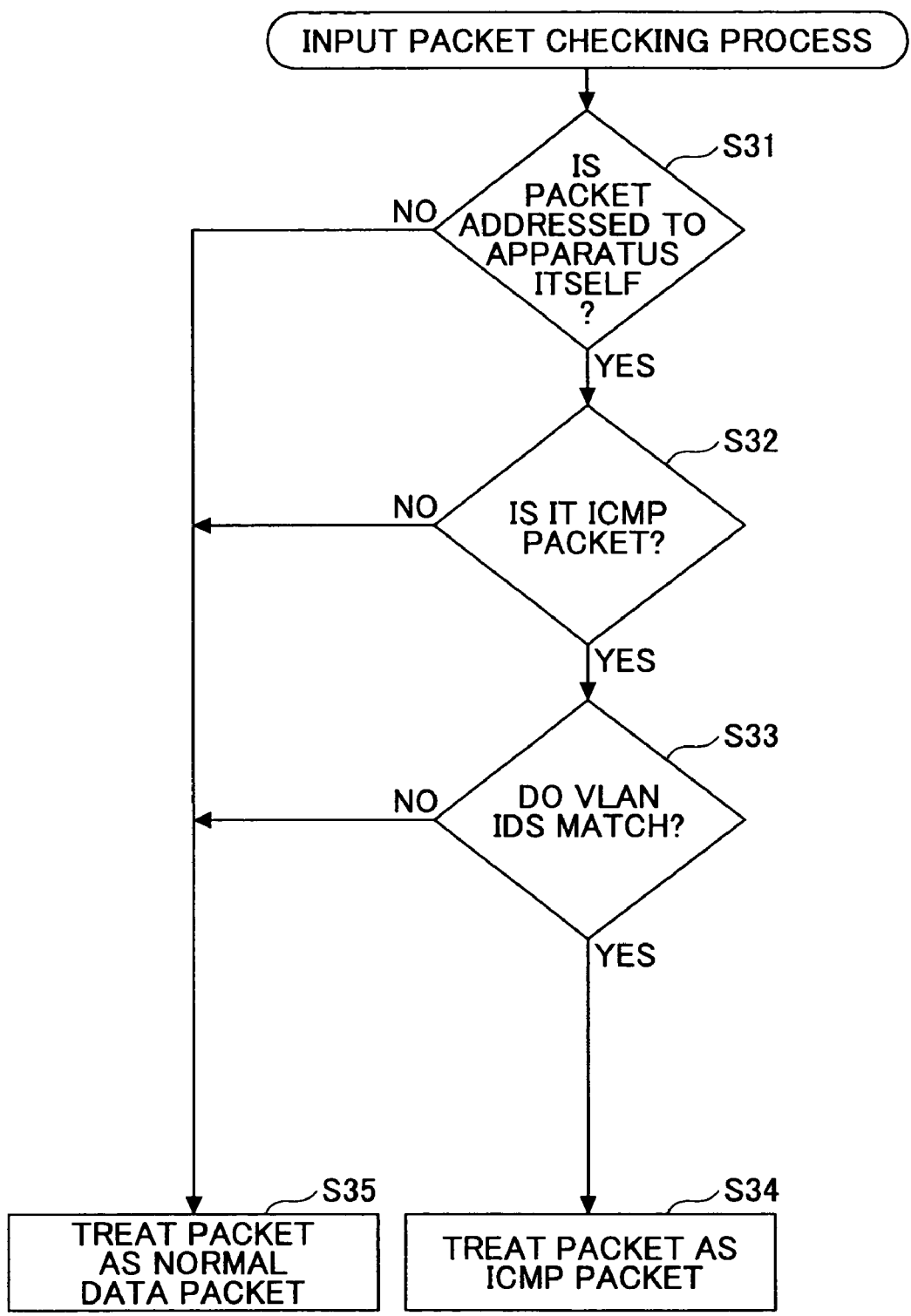
FIG. 13 is a flowchart illustrating an exemplary process performed by an input packet checking unit.

When a packet is received, the input packet checking unit 31 of the hardware processing unit 20 of the receiving port of the switching apparatus B determines whether the packet is addressed to the switching apparatus B itself in step S31 in FIG. 13. If the packet is addressed to the switching apparatus B, the input packet checking unit 31 determines whether the packet is an ICMP packet. If the packet is an ICMP packet, the input packet checking unit 31 determines, in step S33, whether the set VLAN ID and the VLAN ID in the packet match. If the VLAN IDs match, the input packet checking unit 31 transmits the packet to the ICMP packet reception processing unit 14 of the software processing unit 10. If the packet is not addressed to the switching apparatus B, is not an ICMP packet, or has a different VLAN ID, the packet is treated as a normal data packet in step S35.

Figure 14:
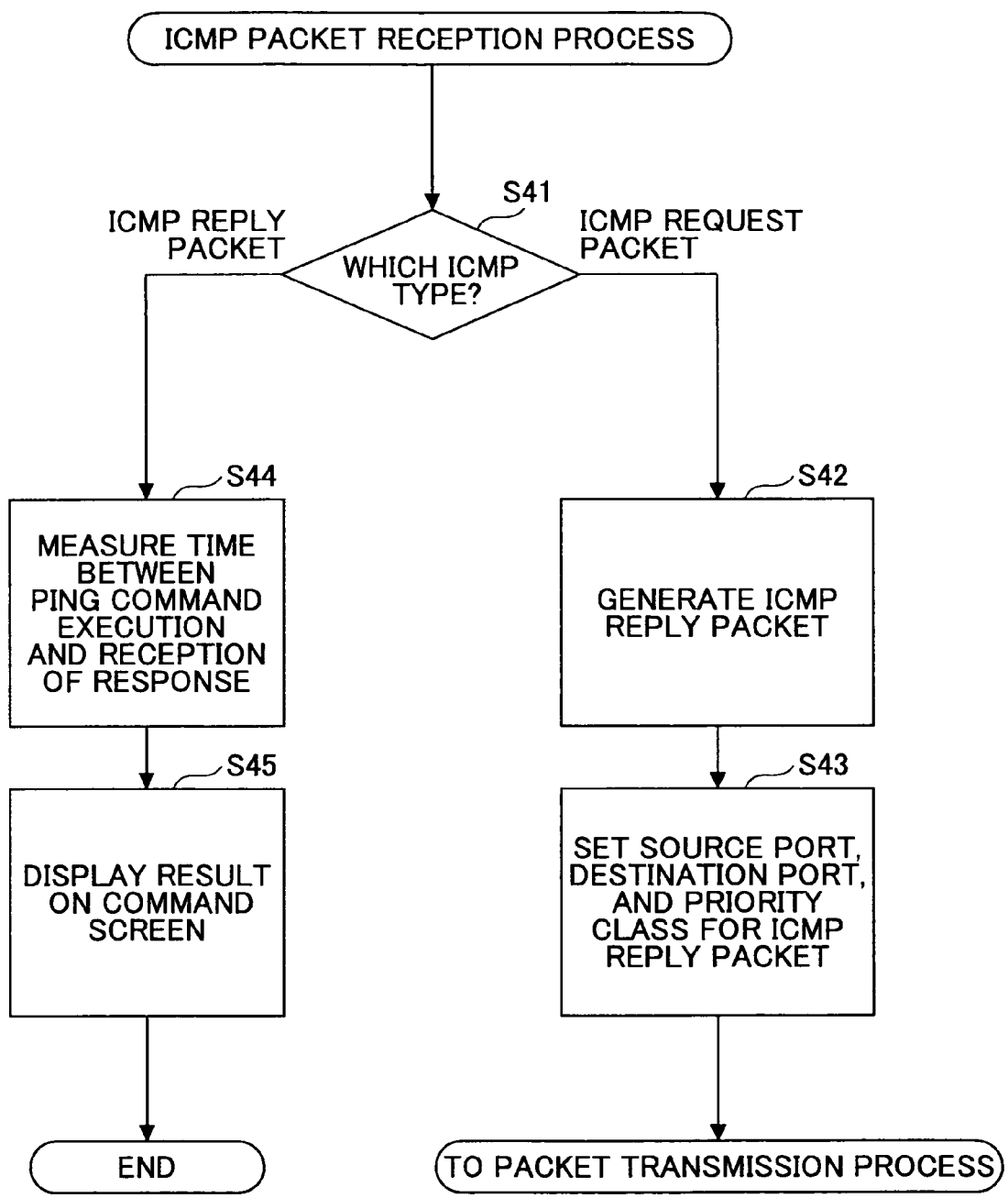
FIG. 14 is a flowchart illustrating an exemplary process performed by an ICMP packet reception processing unit.

As shown in step S41 in FIG. 14, the ICMP packet reception processing unit 14 determines whether the packet transmitted from the input packet checking unit 31 is an ICMP request packet or an ICMP reply packet. If the packet is an ICMP request packet, the ICMP packet reception processing unit 14 generates an ICMP reply packet in step S42.

In step S43, the ICMP packet reception processing unit 14 sets a source port, a destination port, and a priority class for the ICMP reply packet. For both the source port and the destination port, the same port which received the ICMP request packet is specified; for the priority class, the same priority class as that in the VLAN tag of the ICMP request packet is specified. The ICMP reply packet generated in step S43 is transmitted to the priority determining unit 21 via the input packet checking unit 31 of the hardware processing unit 20.

If the packet is an ICMP reply packet in step S41, the ICMP packet reception processing unit 14 measures, in step S44, the ping response time between the execution of the ping command and the reception of the response, or more specifically between the generation of the ICMP request packet and the reception of the ICMP reply packet. Then, in step S45, the ICMP packet reception processing unit 14 displays the measured response time on a command screen of the management apparatus 40.

After receiving the ICMP reply packet in step S43, the priority determining unit 21 determines the local priority level of the ICMP reply packet in the same manner as in the transmission process shown in FIG. 8. Then, the destination determining unit 22 determines the destination port for the ICMP reply packet. In this case, since the receiving port is specified both as the source port and the destination port for the ICMP reply packet, the destination of the ICMP reply packet is the receiving port. Therefore, the ICMP reply packet turns around at the packet switching unit 24. On the other hand, an ICMP request packet determined to be treated as a normal data packet in step S33 in FIG. 13 is switched by the packet switching unit 24 to a different port.

The ICMP reply packet, which is transmitted from the packet switching unit 24 to the priority control (QoS) unit 25, is prioritized in the same manner as a normal data packet. The ICMP reply packet is then counted by the statistical information counting unit 26, and transmitted from the output packet processing unit 27 to the network.

The ICMP reply packet is transmitted via the network and received by the input packet checking unit 31 shown in FIG. 8 of the switching apparatus A. Then, the ICMP reply packet goes through processes as shown in FIG. 13 and FIG. 14. The ICMP packet reception processing unit 14 in the software processing unit 10 determines that the ICMP reply packet is an ICMP reply packet and, in step S45 in FIG. 14, displays the result of the ping command on the command screen.

As described above, a switching apparatus according to an embodiment of the present invention makes it possible to execute the ping command separately for each VLAN, and thereby enables performing a ping test between switching apparatuses for each VLAN. Since a VLAN ID is often used to identify end users, such a switching apparatus makes it possible to perform ping tests taking into account end users.

2. Second Embodiment

A network administrator can display the statistical information, which is collected by the statistical information management unit 13 at regular intervals and stored in the statistical information database 17, by submitting a command from the management apparatus 40.

As shown in FIG. 15A, when a command for displaying the statistical information is submitted (31), the command control unit 11 requests the statistical information management unit 13 to retrieve the statistical information (32). The statistical information is collected as described in the first embodiment at regular intervals controlled by the timer control unit 15 and stored in the statistical information database 17. The statistical information management unit 13 retrieves the statistical information based on the request (33) and displays the information via the command control unit 11 in a format easy to understand for the network administrator (34).

FIG. 15B is a drawing illustrating an exemplary display format of retrieved statistical information. In FIG. 15B, the statistical information of a specified port (port no. 1) is displayed. Each set of three lines shows the number of packets, the number of bytes, and the number of discarded packets for each internal priority level of ICMP packets or other packets.

Displaying the statistical information for normal data packets and ICMP control packets separately as described above makes it possible to confirm whether packets are processed according to an intended priority order in a switching apparatus.

3. Third Embodiment

Figure 16A:
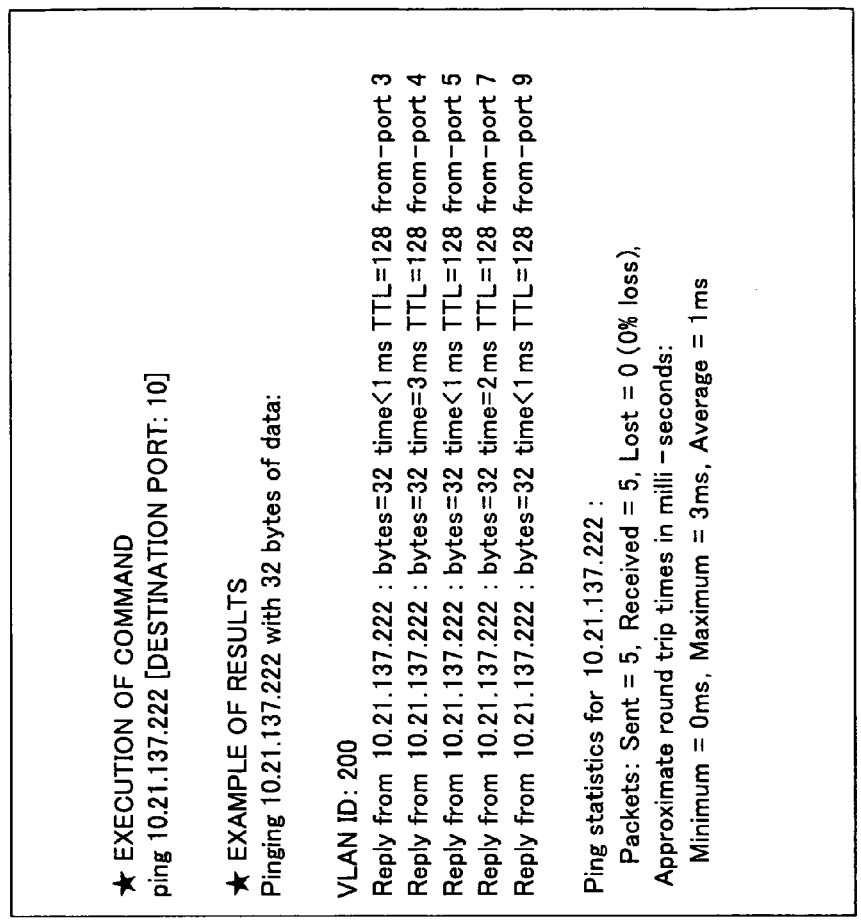
FIG. 16A is a block diagram illustrating an exemplary process of performing a batch test according to a third embodiment of the present invention.

FIG. 16A is a block diagram illustrating an exemplary process of performing a batch test in a switching apparatus according to the third embodiment of the present invention. In FIG. 16A, a ping command is submitted with only the IP address of the switching apparatus B and a destination port of the switching apparatus A specified (41). A source port and a priority class are not specified for the ping command.

In this case, the ICMP request packet generating unit 12 in the software processing unit 10 obtains the VLAN ID set for the destination port from a VLAN setting information database 18 (42). Then, the ICMP request packet generating unit 12 searches for other ports with the same VLAN ID (43). For example, when port number 10 is specified as the destination port for the ping command, port numbers 3, 4, 5, 7, and 9 having VLAN ID 200 are identified.

The ICMP request packet generating unit 12 generates, for each priority class (0 through 7), multiple ICMP request packets each having a different source port (port number 3, 4, 5, 7, or 9 identified in the previous step) and the same destination port (port number 10). The ICMP request packet generating unit 12 transmits those ICMP request packets one by one to the priority determining unit 21 in the hardware processing unit 20 to perform a batch test (44).

Subsequent processes for those ICMP request packets are the same as described in the first embodiment. As described above, a switching apparatus according to the third embodiment makes it possible to perform ping tests for all routes between a specified destination port and source ports having a same VLAN ID by submitting a ping command just once.

Figure 16B:
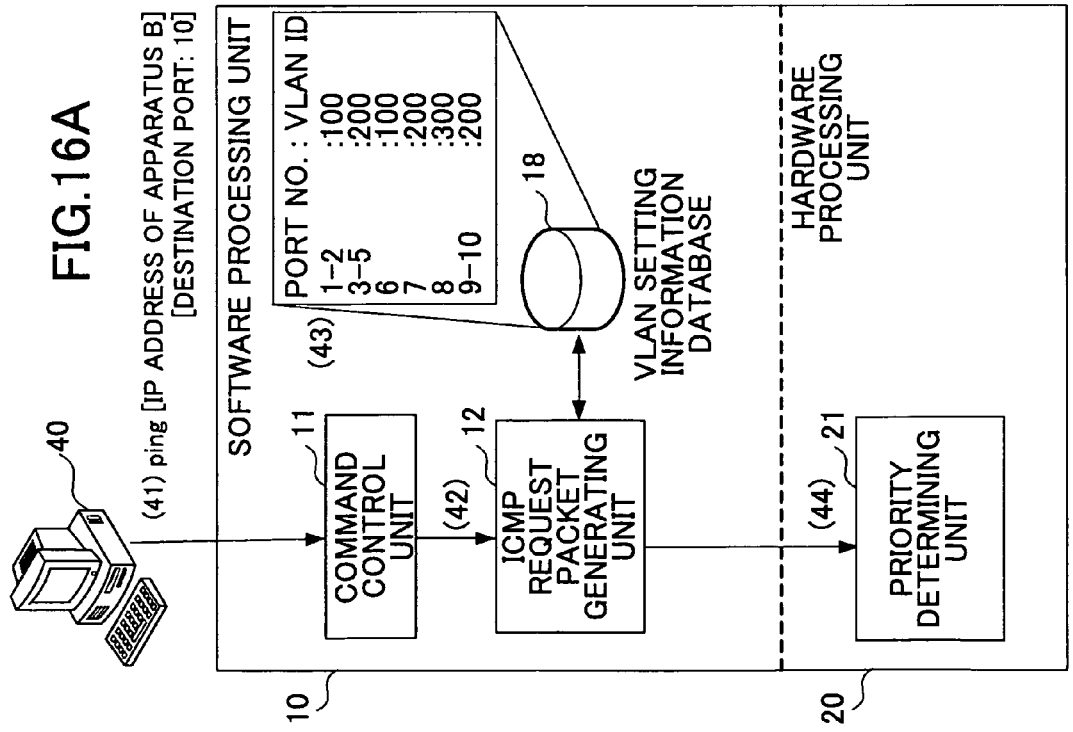
FIG. 16B is a drawing illustrating an exemplary display format of the batch test results.

FIG. 16B is a drawing illustrating an exemplary display format of the batch test results. In FIG. 16B, results of ping tests for all routes mentioned above are displayed on the command screen. Also, the statistical information regarding the number of packets can be displayed by submitting a command as described in the second embodiment.

A switching apparatus according to the third embodiment of the present invention makes it possible to confirm that priority control of packets in a switching apparatus is performed adequately in all routes corresponding to a VLAN ID by submitting a ping command just once.

The ICMP packet reception processing unit 14 in the description of the preferred embodiments corresponds to a packet reception processing unit and a ping response time measuring unit in the claims, the ICMP request packet generating unit 12 corresponds to a request packet generating unit, and the statistical information management unit 13 corresponds to a statistical information management unit.

The present invention is not limited to the specifically disclosed embodiments, and variations and modifications may be made without departing from the scope of the present invention.

The present application is based on Japanese Priority Application No. 2006-080803 filed on Mar. 23, 2006 with the Japanese Patent Office, the entire contents of which are hereby incorporated by reference.

What is claimed is:

1. A switching apparatus which receives an input packet from a network at a receiving port and transmits a processed packet in response to the input packet to the network, comprising:
   an input packet checking unit to determine whether an input packet from the receiving port is a packet addressed to the switching apparatus and having a predetermined virtual local area network ID;
   a packet reception processing unit to generate a reply packet as a response to the input packet from the input packet checking unit when the input packet is determined as being a request packet having a virtual local area network tag and transmitted for a ping test via the network to the switching apparatus, the packet reception processing unit setting a same priority class in a virtual local area network tag of the reply packet as that in the virtual local area network tag of the request packet; and
   a priority control unit to perform priority control on the reply packet from the packet reception processing unit based on the priority class in the virtual local area network tag of the reply packet.

2. The switching apparatus as claimed in claim 1, further comprising:
   a request packet generating unit to generate a request packet used for a ping test and having a virtual local area network tag, and set a source port, a destination port, and a priority class for the request packet as specified by a ping command, wherein the priority control unit performs priority control on the request packet based on the priority class in the virtual local area network tag of the request packet.

3. The switching apparatus as claimed in claim 1, wherein the packet reception processing unit generates a reply packet when the input packet is determined as being a request packet having the predetermined virtual local area network ID.

4. The switching apparatus as claimed in claim 1, further comprising:
a statistical information management unit to manage number-of-packets information separately for request/reply packets and normal data packets.

5. The switching apparatus as claimed in claim 1, further comprising:
a ping response time measuring unit to measure, when a reply packet addressed to the switching apparatus is received, ping response time between generation of a request packet requesting said reply packet and reception of said reply packet.

6. The switching apparatus as claimed in claim 2, wherein the request packet generating unit generates, when the priority class is not specified by the ping command, generates a same number of request packets as that of priority classes, each request packet having a different priority class selected from the priority classes.

7. The switching apparatus as claimed in claim 2, wherein the request packet generating unit searches, when the destination port is specified and the source port is not specified by the ping command, ports having a same virtual local area network ID as that of the destination port, and generates a same number of request packets as that of ports found by the search, each request packet having the same destination port and a different source port selected from the ports found by the search.

8. The switching apparatus as claimed in claim 6, wherein the request packet generating unit searches, when the destination port is specified and the source port is not specified by the ping command, ports having a same virtual local area network ID as that of the destination port, and generates a same number of request packets as that of ports found by the search, each request packet having the same destination port and a different source port selected from the ports found by the search.

* * * * *